(12) United States Patent
Srinivasan et al.

(10) Patent No.: US 8,787,840 B2
(45) Date of Patent: Jul. 22, 2014

(54) METHOD AND SYSTEM EMPLOYING WIDEBAND SIGNALS FOR RF WAKEUP

(75) Inventors: Bhaskar Srinivasan, Menlo Park, CA (US); Abtin Keshavarzian, Palo Alto, CA (US); Dhananjay Lal, Mountain View, CA (US)

(73) Assignee: Robert Bosch GmbH, Stuttgart (DE)

(*) Notice: Subject to any disclaimer, the term of this patent is extended or adjusted under 35 U.S.C. 154(b) by 2489 days.

(21) Appl. No.: 11/432,074

(22) Filed: May 10, 2006

(65) Prior Publication Data

US 2007/0264963 A1 Nov. 15, 2007

(51) Int. Cl.
*H04B 7/00* (2006.01)
(52) U.S. Cl.
USPC ............. 455/69; 455/574; 455/517; 370/216; 370/217; 370/221; 370/254; 370/338
(58) Field of Classification Search
USPC ......... 455/343.2, 41.2, 63, 68, 436, 437, 574, 455/59, 517; 375/134, 137; 370/216, 217, 370/221, 254–256, 310, 328, 338, 350
See application file for complete search history.

(56) References Cited

U.S. PATENT DOCUMENTS

| | | | | |
|---|---|---|---|---|
| 3,546,695 A | * | 12/1970 | Freedman | 342/42 |
| 4,129,868 A | * | 12/1978 | Tahara et al. | 342/51 |
| 4,789,983 A | * | 12/1988 | Acampora et al. | 370/349 |
| 5,636,216 A | * | 6/1997 | Fox et al. | 370/402 |
| 5,648,984 A | * | 7/1997 | Kroninger et al. | 375/211 |
| 5,875,179 A | * | 2/1999 | Tikalsky | 370/315 |
| 6,292,508 B1 | * | 9/2001 | Hong et al. | 375/134 |
| 6,356,763 B1 | * | 3/2002 | Kangas et al. | 455/456.1 |
| 6,466,608 B1 | * | 10/2002 | Hong et al. | 375/137 |
| 6,477,354 B1 | * | 11/2002 | Roberts et al. | 455/7 |
| 7,564,826 B2 | * | 7/2009 | Sherman et al. | 370/338 |
| 2003/0152041 A1 | * | 8/2003 | Herrmann et al. | 370/310 |
| 2003/0224731 A1 | * | 12/2003 | Yamaura et al. | 455/63.3 |
| 2005/0099985 A1 | * | 5/2005 | Callaway et al. | 370/338 |
| 2005/0183120 A1 | * | 8/2005 | Jain et al. | 725/46 |
| 2006/0194564 A1 | | 8/2006 | Hokimoto et al. | |
| 2006/0242285 A1 | * | 10/2006 | Moriwaki | 709/223 |
| 2006/0290519 A1 | * | 12/2006 | Boate et al. | 340/573.4 |
| 2007/0099678 A1 | * | 5/2007 | Kim et al. | 455/574 |

FOREIGN PATENT DOCUMENTS

| | | |
|---|---|---|
| WO | WO 2005/010214 | 2/2005 |
| WO | WO 2005/013637 | 2/2005 |

OTHER PUBLICATIONS

European Search Report for EP 07 00 9190, date Feb. 6, 2009.

* cited by examiner

*Primary Examiner* — Ganiyu A Hanidu
(74) *Attorney, Agent, or Firm* — Kenyon & Kenyon LLP

(57) ABSTRACT

A method of reducing an energy consumption of a wireless network, the method including periodically entering a sleep mode by a receiver node, broadcasting a signal simultaneously across a wide band frequency range, upon waking up from the sleep mode, listening by the receiver node to only a first narrow part of the wide band frequency range, the receiver node subsequently either returning to sleep if a signal strength of the broadcasted signal is less than a predefined signal strength threshold, or staying awake for an additional period of time if the signal strength of the broadcasted signal is greater than the predefined signal strength threshold.

17 Claims, 4 Drawing Sheets

METHOD AND SYSTEM EMPLOYING WIDEBAND SIGNALS FOR RF WAKEUP

FIELD OF THE INVENTION

The present invention relates to a method and system employing wideband signals to wakeup nodes of network.

BACKGROUND INFORMATION

A wireless sensor network may be implemented as a distributed system of nodes, each equipped, for example, with a radio transceiver, a microcontroller and one or more sensors and/or actuators. Nodes in such networks may be required to be small in size and inexpensive, which may impose certain limitations with respect to energy storage and consumption. Therefore, reducing the amount of energy consumed by the node may be an important factor in its design.

One way to conserve energy is to have one or more receiver nodes of the network employ a low-power/sleep mode according to a certain duty cycle, which is shown in FIG. 1. Here, the receiver node sleeps most of the time and periodically wakes up for a short period of time to check the broadcast channel for a certain signal in a particular frequency (e.g., a predefined broadcast tone), which is sometimes referred to as the "RF wakeup signal". If during the wakeup period, the receiver node notices that the signal strength is higher than a certain threshold, this may indicate that another node is attempting to send a message to the receiver node. In this instance, the receiver node will remain active and attempt to receive the message from the sender node. Thus, in this scenario, in order to transmit a message to the receiver node, the sender node must first awaken the receiver node by sending the proper RF wakeup signal with the proper frequency on the proper channel, each of which must be known by the receiver node.

A node may be awakened unnecessarily due to noise or interference in the channel even when there is no transmitter. If the frequency channel in which the RF wakeup is to be performed is too noisy or being used or interfered with by other systems, the nodes may switch to another frequency channel to avoid having to be unnecessarily woken up by the excessive noise or interference. However, once the switch to another frequency channel is made, all neighboring nodes of the receiver node, that is, all potential transmitters of a message to the receiver node, should be informed of the switch so that they aware of the proper frequency channel in which to send any subsequent RF wakeup signals in the future. This in turn creates additional overhead for the network, which may require additional energy resources.

Thus, it may be desirable to adaptively change the frequency channel at which the receiver node listens for the RF wakeup signal so that the channel with the least noise and interference is always used, but such an adaptive change may require that the RF wakeup be performed more often and may also create additional overhead for the network since for each switch in frequency channel all neighbors of the receiver node will need to be informed.

SUMMARY OF THE INVENTION

An exemplary method and/or exemplary embodiment of the present invention relates to a method and system employing wideband signals to wakeup nodes of network. In particular, the exemplary method and/or exemplary embodiment of the present invention may eliminate the need to inform neighboring nodes when switching to a different frequency channel, which may be required, for example, when one or more the receiver nodes encounter certain adverse conditions with respect to the communications channel. Accordingly, the exemplary method and/or exemplary embodiment of the present invention may provide greater flexibility in how often the network nodes may change their wakeup frequency without imposing additional overhead for the network.

According to an exemplary embodiment and/or exemplary method of the present invention, rather than the sender node transmitting a signal/tone in a narrow-band frequency channel, the sender node sends a wide band signal/tone which covers all frequency channels that may be used by the receiver node(s). In this manner, the sender node is not required to know on which frequency a particular receiver node is performing the RF wakeup. Thus, each receiver node of the network may locally select its wakeup frequency. Moreover, each receiver node may change its wakeup frequency as often as necessary since there is no requirement to inform neighboring nodes of the change.

According to an exemplary embodiment and/or exemplary method of the present invention, a wideband signal is sent by the transmitting node and the signal strength is checked in any narrow part of the band at the receiver. The transmitting node does not need to know which frequency the intended receiver node is listening to and will perform the RF wakeup on multiple frequencies. In this manner, each node of the network may locally select its wakeup frequency and choose the channel with the least interference and/or noise.

According to an exemplary embodiment and/or exemplary method of the present invention, the wideband signal/tone sent by the transmitting node may consume more energy than if a narrowband tone were sent. However, the increase in energy may not be significant because in low power radios, for example, the power consumed by the non-transmission related circuitry (and not the transmission power) may be the dominant power term. Thus, an overall savings in terms of energy may be achieved.

An exemplary embodiment and/or exemplary method of the present invention may be particularly useful for mobile nodes, which may not necessarily know their neighbors and the frequency channel on which they should perform wakeup.

An exemplary embodiment and/or exemplary method of the present invention is directed to reducing an energy consumption of a wireless network, the exemplary embodiment and/or exemplary method including periodically entering a sleep mode by a receiver node, broadcasting a signal simultaneously across a wide band frequency range, upon waking up from the sleep mode, listening by the receiver node to only a first narrow part of the wide band frequency range, the receiver node subsequently returning to sleep if a signal strength of the broadcasted signal is less than a predefined signal strength threshold, and staying awake for an additional period of time if the signal strength of the broadcasted signal is greater than the predefined signal strength threshold.

Another exemplary embodiment and/or exemplary method of the present invention is directed to reducing an energy consumption of a wireless network, in which the broadcast signal is an RF wakeup signal.

Yet another exemplary embodiment and/or exemplary method of the present invention is directed to reducing an energy consumption of a wireless network, in which the broadcast signal is a tone.

Still another exemplary embodiment and/or exemplary method of the present invention is directed to reducing an energy consumption of a wireless network, in which a size ratio of the first narrow part of the wide band frequency range to the wide band frequency range is about 1:8.

Yet another exemplary embodiment and/or exemplary method of the present invention is directed to reducing an energy consumption of a wireless network, in which the receiver node is a mobile node.

Still another exemplary embodiment and/or exemplary method of the present invention is directed to reducing an energy consumption of a wireless network, in which the broadcast signal indicates an intent to subsequently transmit a message.

Yet another exemplary embodiment and/or exemplary method of the present invention is directed to reducing an energy consumption of a wireless network, the exemplary embodiment and/or exemplary method including determining an adverse condition affecting the first narrow part of the wide band frequency range, and switching to a second narrow part of the wide band frequency range if the adverse condition exceeds a predefined threshold level.

Still another exemplary embodiment and/or exemplary method of the present invention is directed to reducing an energy consumption of a wireless network, in which the adverse condition is noise.

Yet another exemplary embodiment and/or exemplary method of the present invention is directed to reducing an energy consumption of a wireless network, in which the adverse condition is interference.

Still another exemplary embodiment and/or exemplary method of the present invention is directed to reducing an energy consumption of a wireless network, in which the switch is performed in a non-informing manner with respect to nodes that neighbor the receiver node.

An exemplary embodiment and/or exemplary method of the present invention is directed to a wireless network that includes a plurality of nodes, in which at least one of the plurality of nodes is configured to broadcast a wideband signal simultaneously across a predefined frequency range, and at least one of the plurality of nodes is configured to selectively receive transmission of the wideband signal in a plurality of narrow parts of the predefined frequency range.

Another exemplary embodiment and/or exemplary method of the present invention is directed to a wireless network, in which at least one of the plurality of nodes periodically enters a sleep mode and, upon waking up, listens to only a narrow part of the predefined frequency range.

Yet another exemplary embodiment and/or exemplary method of the present invention is directed to a wireless network, in which the at least one of the plurality of nodes, upon waking up, listens to only the narrow part of the predefined frequency range, subsequently returns to sleep if a signal strength of the broadcasted signal is less than a predefined signal strength threshold, and stays awake for an additional period of time if the signal strength of the broadcasted signal is greater than the predefined signal strength threshold.

Still another exemplary embodiment and/or exemplary method of the present invention is directed to a wireless network, in which the at least one of the plurality of nodes, upon waking up, listens to only the narrow part of the predefined frequency range, determines an adverse condition affecting the narrow part of the predefined frequency range, and switches to another narrow part of the predefined frequency range if the adverse condition exceeds a predefined threshold level.

Yet another exemplary embodiment and/or exemplary method of the present invention is directed to a wireless network, in which the switch is performed in a non-informing manner with respect to neighboring nodes.

Still another exemplary embodiment and/or exemplary method of the present invention is directed to a wireless network, in which a size ratio of the narrow part of the predefined frequency range wide to the predefined frequency range is about 1:8.

An exemplary embodiment and/or exemplary method of the present invention is directed to a wireless sensor node, which includes an arrangement to power the wireless sensor node, an arrangement to at least one of sense an environmental condition and actuate upon a stimulus, an arrangement to receive a wireless transmission, and a microcontroller to control an operation of the wireless sensor node, in which the wireless sensor node is configured to periodically enter a sleep mode, and upon waking up from the sleep mode, listen to only a first narrow part of a signal broadcasted simultaneously across a wide band frequency range, the wireless sensor node further configured to return to sleep if a signal strength of the broadcasted signal is less than a predefined signal strength threshold, and stay awake for an additional period of time if the signal strength of the broadcasted signal is greater than the predefined signal strength threshold.

Another exemplary embodiment and/or exemplary method of the present invention is directed to a wireless sensor node, in which the wireless sensor node is configured to determine an adverse condition affecting the first narrow part of the wide band frequency range, and switch to a second narrow part of the wide band frequency range if the adverse condition exceeds a predefined threshold level.

Yet another exemplary embodiment and/or exemplary method of the present invention is directed to a wireless sensor node, in which a size ratio of the first narrow part of the wide band frequency range to the wide band frequency range is about 1:8.

DETAILED DESCRIPTION

Figure 1:
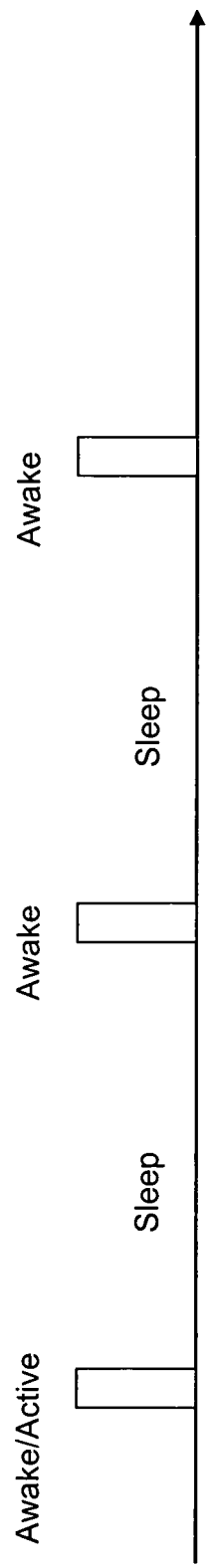
FIG. 1 shows exemplary way to conserve energy by having one or more receiver nodes of a network employ alternating modes of being active and asleep/low power.
Figure 2:
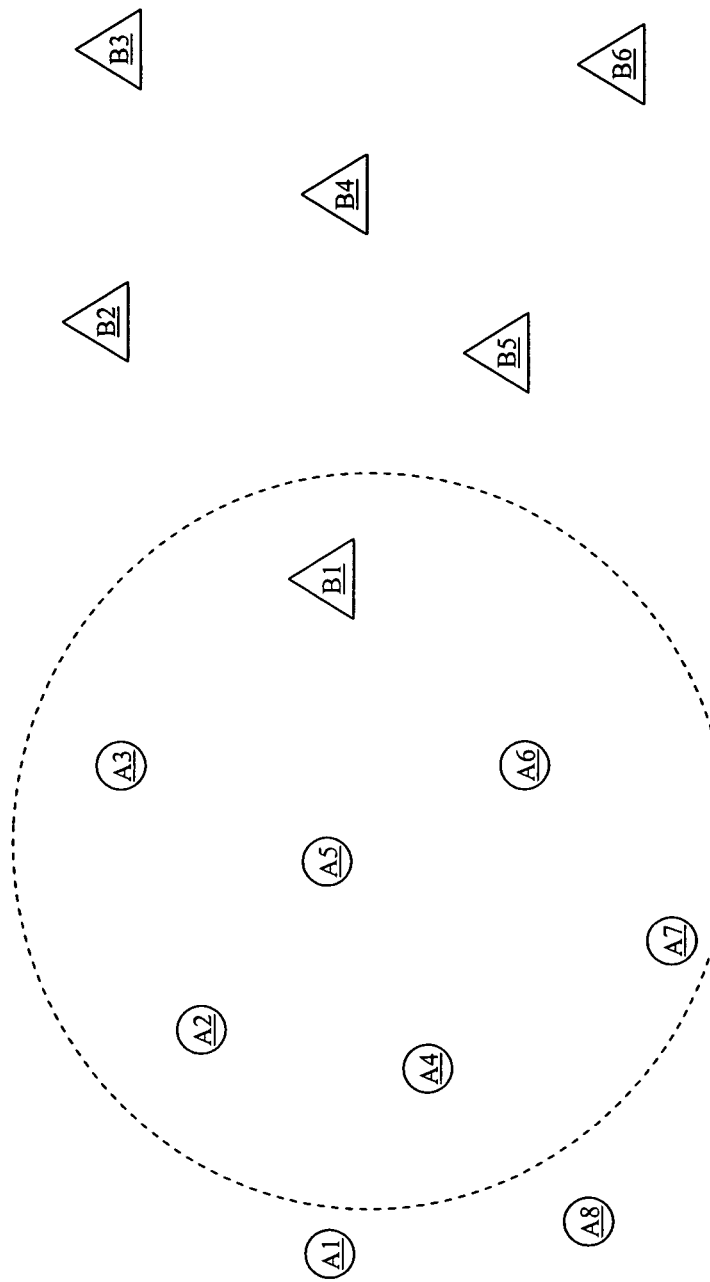
FIG. 2 shows an exemplary configuration of two partially overlapping exemplary wireless mobile networks.

FIG. 2 shows an exemplary configuration 200 of two partially overlapping exemplary wireless mobile networks A and B. The exemplary wireless sensor network A includes eight network nodes A1 to A8 represented in circular form. The exemplary network B includes six network nodes B1 to B6 represented in triangular form. Each of the eight network nodes A1 to A8, and each of the six network nodes B1 to B6, may communicate in a wireless manner on one or more wireless frequency channels, and each may include, for example, sensors and/or actuators, and may move relative to one another in a mobile fashion.

Figure 3:
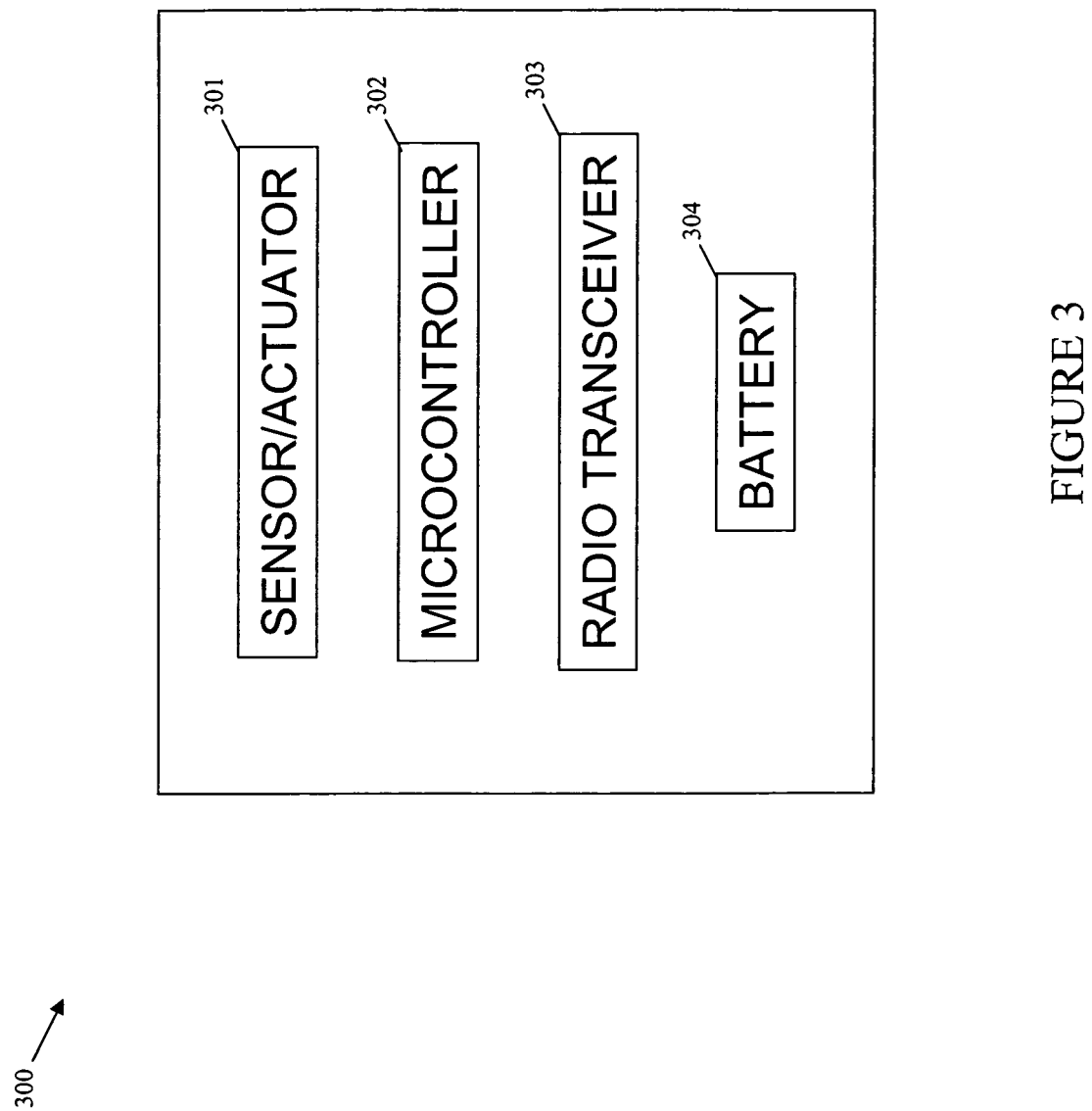
FIG. 3 shows an exemplary network node according to the present invention.

FIG. 3 shows an exemplary network node 300 according to the present invention. The exemplary network node 300 may be, for example, a mobile wireless sensor node. That is, the exemplary network node 300 may be free to move in a non-stationary manner, be equipped with one or more sensors/actuators, and may be constrained to operate on limited energy resources. The exemplary network node 300 includes a sensor/actuator 301, a microcontroller 302, a radio transceiver 303 and a battery 304. The sensor/actuator 301 operates to sense an environmental condition and/or actuate upon an external or internal stimulus. The microcontroller 302 operates to perform overall control of the sensor/actuator 301, the radio transceiver 303 and battery 304. In this regard, the microcontroller 302 may include, for example, a microprocessor and program instructions in accordance with the exemplary method 400 of FIG. 4, described below. The radio transceiver 303 operates to communicate on a frequency channel of the wireless network. The battery 304 provides power to the exemplary network node 300, including power to each of the individual components, i.e., the sensor/actuator 301, the microcontroller 302, and the radio transceiver 303.

As stated above and shown in FIG. 2, the two exemplary wireless mobile networks A and B partially overlap one another. That is, certain nodes of the exemplary wireless network A are within broadcast range of one or more nodes of the exemplary wireless network B, and certain nodes of the exemplary wireless network B are within broadcast range of one or nodes of the exemplary wireless network A. Such an overlapping configuration may pose certain potential adverse conditions with respect to interfering communications, which may affect the operation and/or performance of the exemplary wireless sensor networks A and/or B. For example, network node A2 of the exemplary wireless network A may wish to send a message to network node A5 within the same network A. To do so, network node A2 may need to first awaken network node A5, which may be periodically operating in a sleep mode to conserve energy. In this regard, the network node A2 may transmit an RF wakeup signal, which is detected by the network node A5 upon the network node A5 awakening from its sleep mode, and thereafter network node A5 remains active for an extended period of time to receive the message. However, network node A5 may also be awakened unnecessarily due to noise or interference in the channel, which is caused, for example, by the transmissions of network node B1, which may be operating within the receiving range of network node A5, as represented by the dotted circle of FIG. 2. If it is determined that the frequency channel in which the RF wakeup is to be performed is too noisy or being used or interfered with by network node B1, then network node A5 could switch to another frequency channel to avoid having network node A5 be unnecessarily woken up by the excessive noise or interference. However, rather than inform all neighboring nodes of switch, that is, inform all potential transmitters of a message to network node A5, which may create additional overhead for the exemplary wireless network A and/or consume additional energy, the neighboring nodes may be configured to employ wideband signal for RF wakeup.

Figure 4:
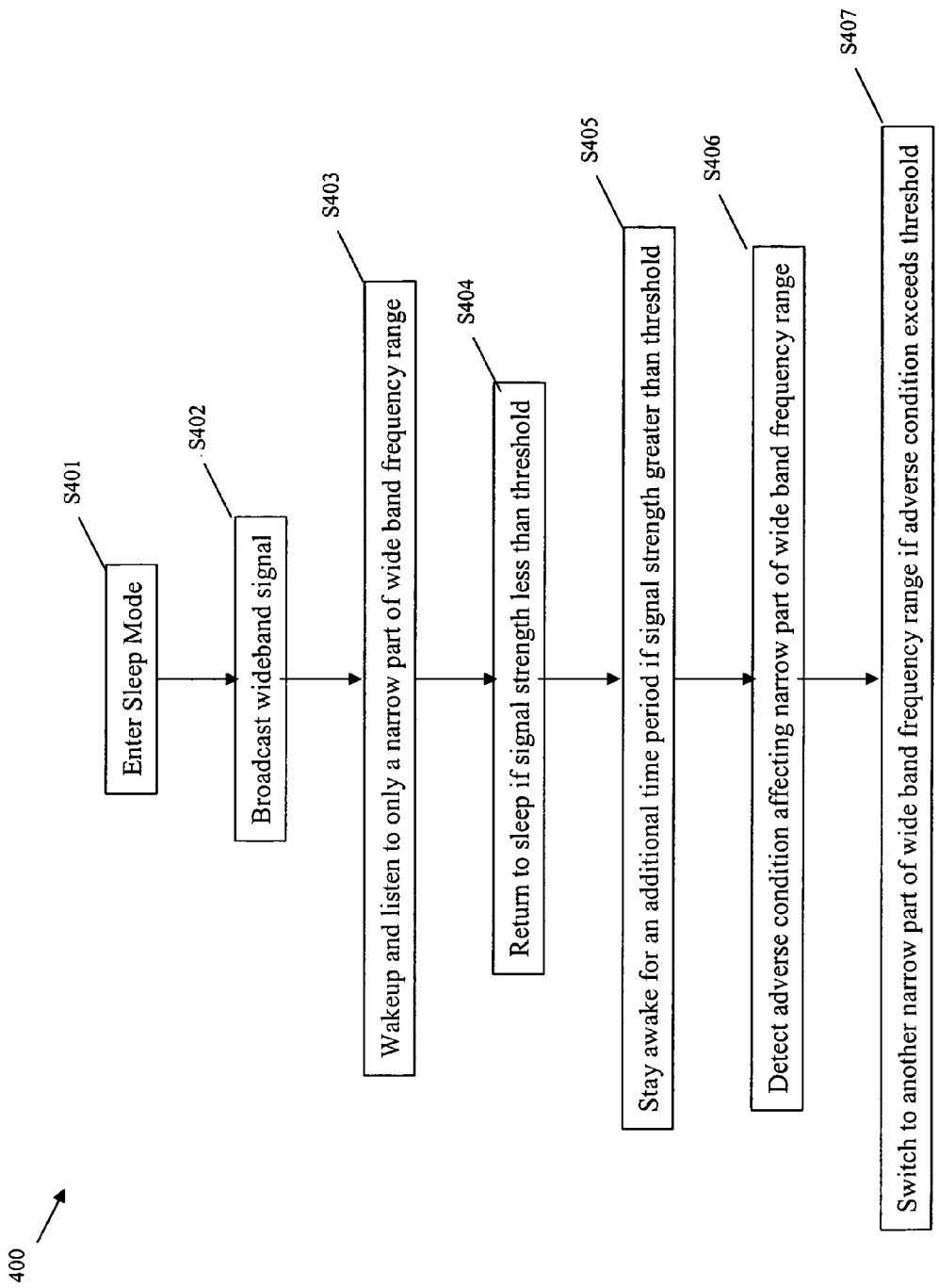
FIG. 4 shows an exemplary method to reduce energy consumption of the exemplary wireless sensor network of FIG. 2.

FIG. 4 shows an exemplary method 400 to reduce energy consumption of the exemplary wireless sensor network A of FIG. 2. In step S401, the network node A5 periodically enters a sleep mode. In step S402, the network node A2 broadcasts a signal simultaneously across a wide band frequency range. In this regard, the broadcasted signal may be, for example, an RF wakeup signal, which may indicate, for example, an intent by network node A2 to transmit a message to the network node A5. In step S403, upon waking up from the sleep mode, the network node A5 listens to only a narrow part of the wide band frequency range. In step S404, the network node A5 subsequently returns to sleep if a signal strength of the broadcasted signal is less than a predefined signal strength threshold. Otherwise, in step S405 if the signal strength of the broadcasted signal is greater than the predefined signal strength threshold, the network node A5 stays awake for an additional period of time.

In step S406, the network node A5 may detect an adverse condition affecting the narrow part of the wide band frequency range the network node A5 is currently listening to. Here, the adverse condition may be, for example, noise and/or interference. In step S407, if the adverse condition exceeds a predefined threshold, the network node A5 switches to listening to another narrow part of the wide band frequency range. In this regard, rather than the network node A5 inform all of its neighboring nodes of the switch, that is, rather than inform network nodes A2 to A7 which are potential transmitters of a message to network node A5 and which are within the receiving range of network node A5, as indicated by the dotted circle shown in FIG. 2, the neighboring nodes A2 to A7 are configured to employ a wideband signal for RF wakeup.

According to an exemplary embodiment of the present invention, the narrow part of the wide band frequency range to which a network node listens may be ⅛ as wide as compared to the range of the wideband signal itself. For example, a wideband transmitter may transmit a 200 KHz signal, which may be heard by 8 narrowband listeners in different frequency bands each tuned for 25 KHz reception. In this regard, the wideband frequency range may be broader or less broad, and the narrow part of the wideband frequency range to which a network node listens may be more or less narrow, depending on system requirements and/or environmental conditions.

What is claimed is:

1. A method of reducing an energy consumption of a wireless network, the method comprising:
    periodically entering a sleep mode by a receiver node;
    broadcasting a signal simultaneously across an entirety of a wide band frequency range; and
    upon waking up from the sleep mode, listening by the receiver node to only a first narrow part of the wide band frequency range, the receiver node subsequently performing one of the following:
        returning to sleep if a signal strength of the broadcasted signal is less than a predefined signal strength threshold; and
        staying awake for an additional period of time if the signal strength of the broadcasted signal is greater than the predefined signal strength threshold.

2. The method of claim 1, wherein the broadcast signal is an RF wakeup signal.

3. The method of claim 1, wherein the broadcast signal is a tone.

4. The method of claim 1, wherein a size ratio of the first narrow part of the wide band frequency range to the wide band frequency range is about 1:8.

5. The method of claim 1, wherein the receiver node is a mobile node.

6. The method of claim 1, wherein the broadcast signal indicates an intent to subsequently transmit a message.

7. The method of claim 1, the method further comprising:
    determining an adverse condition affecting the first narrow part of the wide band frequency range; and
    switching, by the receiver node, to listening to only a second narrow part of the wide band frequency range, if the adverse condition exceeds a predefined threshold level.

8. The method of claim 7, wherein the adverse condition is noise.

9. The method of claim 7, wherein the adverse condition is interference.

10. The method of claim 7, wherein the switch is performed in a non-informing manner with respect to nodes that neighbor the receiver node.

11. A wireless network comprising:
a plurality of nodes, wherein:
- at least one of the plurality of nodes is configured to broadcast a wideband signal simultaneously across an entirety of a predefined frequency range; and
- at least one of the plurality of nodes is configured to:
  - select one of a plurality of narrow parts of the predefined frequency range in which to selectively receive transmission of the wideband signal;
  - periodically enter a sleep mode; and
  - upon waking up from the sleep mode:
    - listen to only a narrow part of the predefined frequency range; and
    - subsequently return to sleep if a signal strength of the broadcasted signal is less than a predefined signal strength threshold, and stay awake for an additional period of time if the signal strength of the broadcasted signal is greater than the predefined signal strength threshold.

12. The wireless network of claim 11, wherein the at least one of the plurality of nodes, which, upon waking up, listens to only the narrow part of the predefined frequency range, determines an adverse condition affecting the narrow part of the predefined frequency range, and switches to listening to only another narrow part of the predefined frequency range if the adverse condition exceeds a predefined threshold level.

13. The wireless network of claim 12, wherein the switch is performed in a non-informing manner with respect to neighboring nodes.

14. The wireless network of claim 12, wherein a size ratio of the narrow part of the predefined frequency range wide to the predefined frequency range is about 1:8.

15. A wireless sensor node, comprising:
- an arrangement to power the wireless sensor node;
- an arrangement to at least one of: (a) sense an environmental condition and (b) actuate upon a stimulus;
- an arrangement to receive a wireless transmission; and
- a microcontroller to control an operation of the wireless sensor node,
- wherein the wireless sensor node is configured to periodically enter a sleep mode, and upon waking up from the sleep mode, listen to only a first narrow part of a signal broadcasted simultaneously across an entirety of a wide band frequency range, the wireless sensor node further configured to return to sleep if a signal strength of the broadcasted signal is less than a predefined signal strength threshold, and stay awake for an additional period of time if the signal strength of the broadcasted signal is greater than the predefined signal strength threshold.

16. The wireless sensor node of claim 15, wherein the wireless sensor node is configured to determine an adverse condition affecting the first narrow part of the wide band frequency range, and switch to listening to only a second narrow part of the wide band frequency range if the adverse condition exceeds a predefined threshold level.

17. The wireless sensor node of claim 16, wherein a size ratio of the first narrow part of the wide band frequency range to the wide band frequency range is about 1:8.

* * * * *